(12) United States Patent
Motoda

(10) Patent No.: US 7,140,487 B2
(45) Date of Patent: Nov. 28, 2006

(54) CONVEYOR BELT AND A METHOD OF MAKING SAME

(75) Inventor: Shuho Motoda, Saitama-Pref (JP)

(73) Assignee: San-Ai Industries, Inc., Saitama-Pref (JP)

( * ) Notice: Subject to any disclaimer, the term of this patent is extended or adjusted under 35 U.S.C. 154(b) by 3 days.

(21) Appl. No.: 11/033,301

(22) Filed: Jan. 12, 2005

(65) Prior Publication Data

US 2006/0151303 A1     Jul. 13, 2006

(51) Int. Cl.
*B65G 17/00*     (2006.01)
(52) U.S. Cl. .................................... 198/844.2; 24/33 P
(58) Field of Classification Search ............. 198/844.2; 24/33 P, 33 C, 33 B, 33 R; 29/33 P, 33 C, 29/33 B, 33 R
See application file for complete search history.

(56) References Cited

U.S. PATENT DOCUMENTS

| 1,482,282 | A | * | 1/1924 | Adams | ........................ 24/33 P |
| 5,048,675 | A | * | 9/1991 | Nadalutti | ................. 198/844.2 |
| 5,079,807 | A | * | 1/1992 | Hood | ......................... 24/33 P |
| 5,951,441 | A | * | 9/1999 | Dalebout et al. | ........ 198/844.2 |
| 6,234,304 | B1 | * | 5/2001 | DeGroot et al. | ......... 198/844.2 |
| 6,896,124 | B1 | * | 5/2005 | Herold | .................... 198/844.2 |

* cited by examiner

*Primary Examiner*—James R. Bidwell
(74) *Attorney, Agent, or Firm*—Young & Thompson

(57) ABSTRACT

A conveyor belt comprises one or more elongate pieces of material joined together to form an endless belt. The or each joint extends across the belt at an angle non-perpendicular to the direction of intended travel of the belt. Adjoining ends of the belt are connected together by a plurality of generally U-shaped gripping elements. The free ends of each gripping element grip an adjoining end of the belt and the closed ends of the gripping elements protrude beyond the respective adjoining end of the belt. A hinge pin extends through the protruding parts of the gripping elements of each of the adjoining ends of each belt to connect the adjoining ends of the belt together.

5 Claims, 7 Drawing Sheets

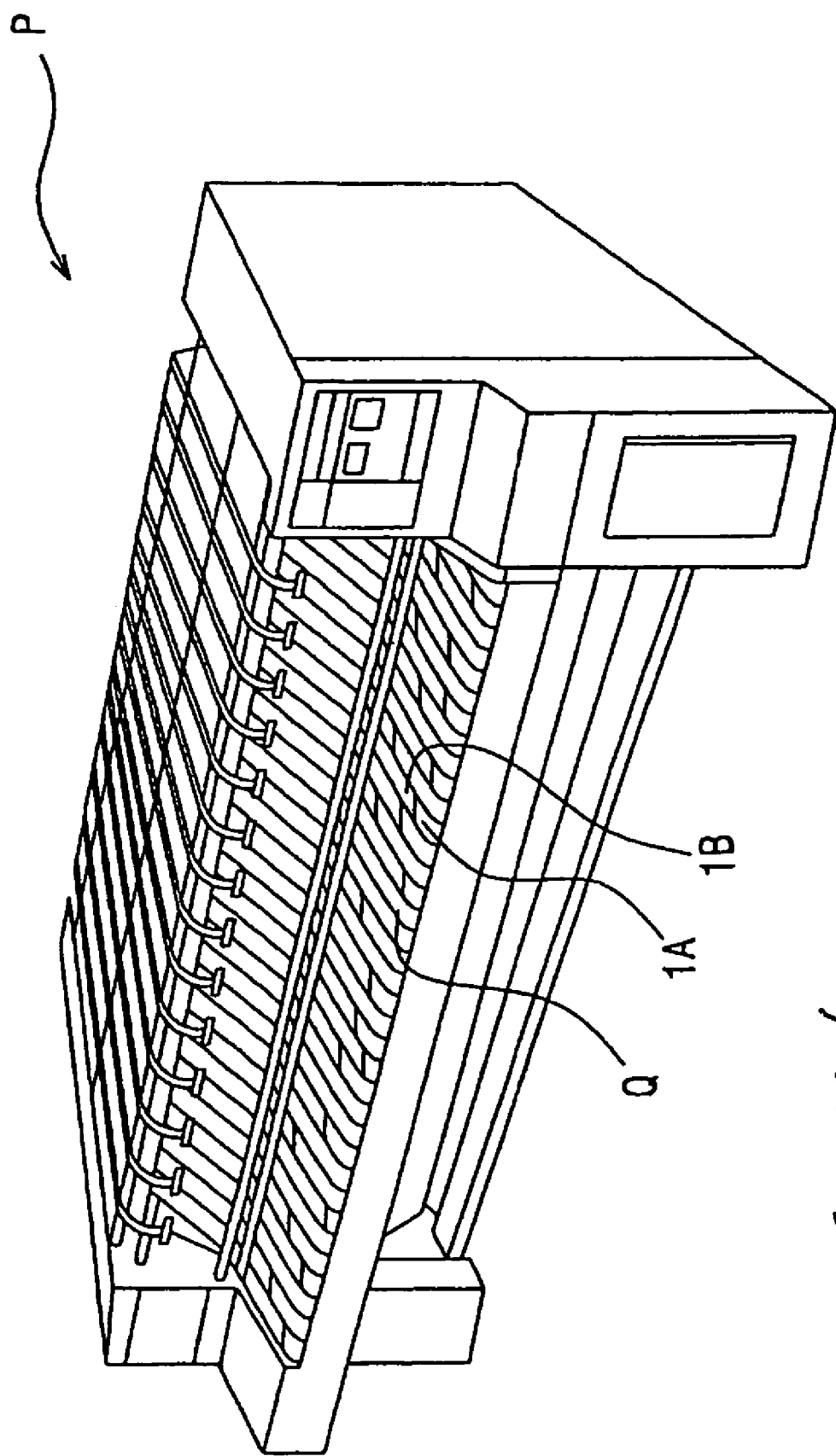

CONVEYOR BELT AND A METHOD OF MAKING SAME

BACKGROUND OF THE INVENTION

This invention relates to a conveyor belt and a method of making same and, more particularly, but by no means exclusively, relates to a conveyor belt for conveying items of laundry.

One known conventional belt is shown in FIGS. 7a and b. Adjoining ends 1A and 1B of the belt Q extend perpendicularly to the intended direction of travel of the belt and are connected together by a plurality of generally U-shaped gripping elements 21, the free ends of which grip an adjoining end of the belt and have closed ends which protrude from the end of the belt. The protruding ends of the gripping elements of one adjoining end alternate with the protruding ends of gripping elements of the other adjoining end across the width of the belt and a hinge pin 41 is inserted through the protruding ends in order to connect the adjoining ends together.

Also, the ends of the belt are taped and hardened or bent over and sewn or glued to prevent them from fraying, depending upon the kind of material of the belt.

This known arrangement suffers from the drawback that when the adjoining ends of the belt pass over a roller L, particularly a small diameter roller such as a roller having a diameter of between 20 mm and 25 mm, the belt rises off the surface of the roller. This results in a loss of friction between the belt and the roller and this can result in the belt coming to a halt or slowing down.

Nevertheless it is particularly important to make use of a small diameter roller to make the closest approach possible to the narrow entrance of a heating chest of a sheet rolling machine in a laundry so that it can feed wet articles to the heating chest without fail.

Then, for example, in the case of a roller with a diameter of 20 mm, the circumference where the belt touches is $20 \times \pi \times 0.5$ (the thickness of the belt)=31.4 mm. This can result in a loss of 25 mm of its frictional contact with roller L due to the belt rising off the surface of the roller.

FIG. 6 shows a multi-belt laundry conveyor and, when equipped with conventional belts, this has a problem conveying the work or washing evenly due to one or more of the belts coming to a halt or slowing down thus causing problems such as wrinkles in the work.

The present invention seeks to overcome this drawback.

SUMMARY OF THE INVENTION

According to a first aspect of the present invention, there is provided a conveyor belt comprising one or more elongate pieces of material joined together to form an endless belt, the or each joint extending across the belt at an angle non-perpendicular to the intended direction of travel of the belt, adjoining ends of the belt being connected together by a plurality of generally U-shaped gripping elements, the free ends of each of which grip a respective adjoining end of the belt and which at their closed ends protrude beyond the respective adjoining end of the belt and a hinge pin extending through the protruding parts of the gripping elements of each of the adjoining ends of the belt.

According to a second aspect of the invention, there is provided a method of attaching the gripping elements of a conveyor belt as claimed in any one of the preceding claims to an adjoining end of the belt, comprising the steps of:

a. providing an elongate support having an upper web portion and two depending flank portions,
b. hanging the gripping elements in spaced relationship with each element on the flank portions of the support,
c. placing the gripping elements in a compressor with the closed ends of the gripping elements supported by the compressor and the open ends of the gripping elements between two closable jaws of the compressor,
d. removing the support, and
e. inserting the respective adjoining end of the belt between the jaws of the compressor and closing the jaws of the compressor to attach the gripping elements to said adjoining end of the belt.

The invention will now be particularly described, by way of example, with reference to the accompanying drawings.

BRIEF DESCRIPTION OF THE DRAWINGS

FIG. 6 is a perspective view of a laundry belt conveying device, and FIGS. 7a and b are fragmentary plan and sectional views, respectively, of a conventional conveyor belt.

DESCRIPTION OF THE PREFERRED EMBODIMENTS

Figure 1:
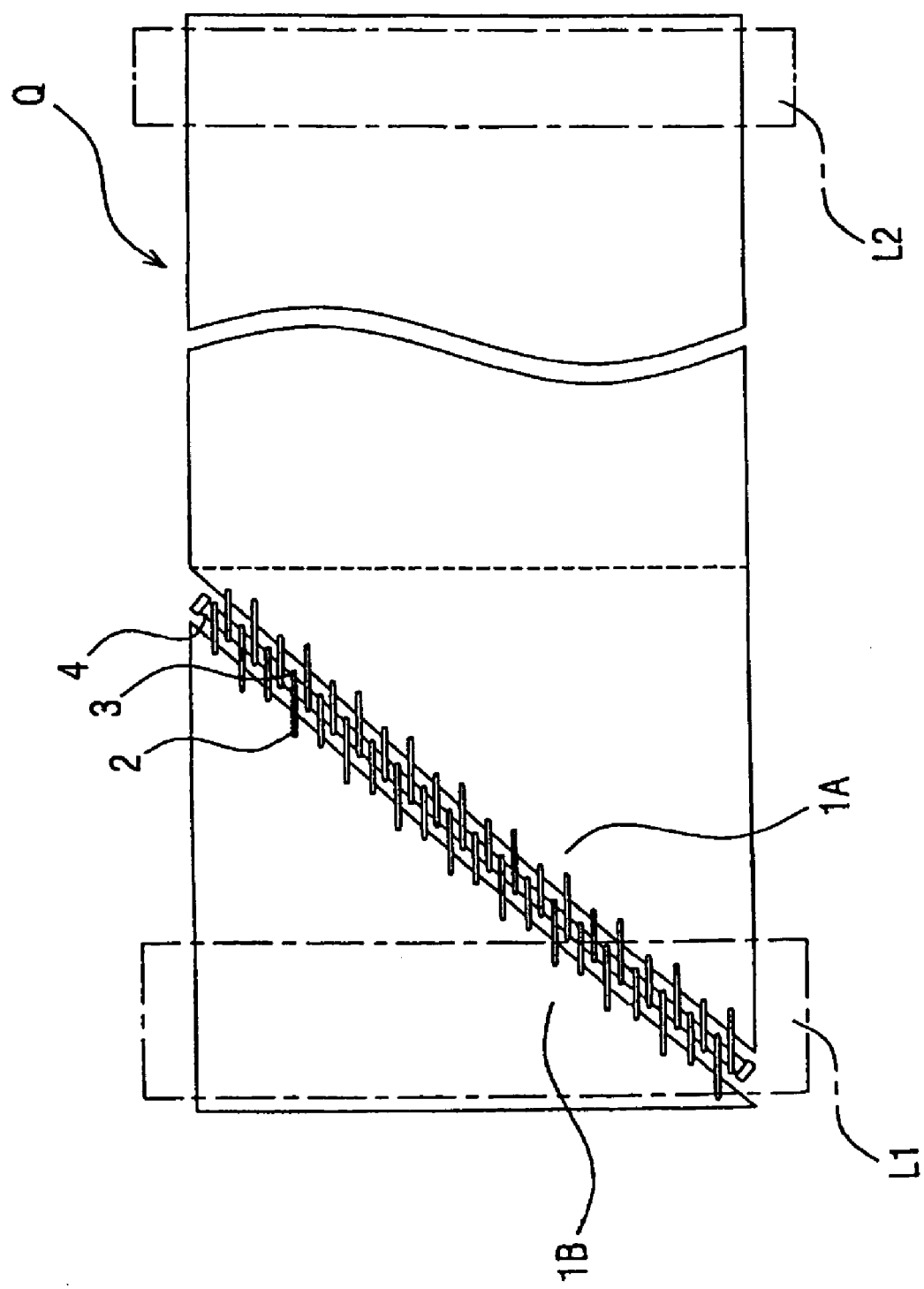
FIG. 1 is a plan view of one example of a conveyor belt according to the present invention.
Figure 2:
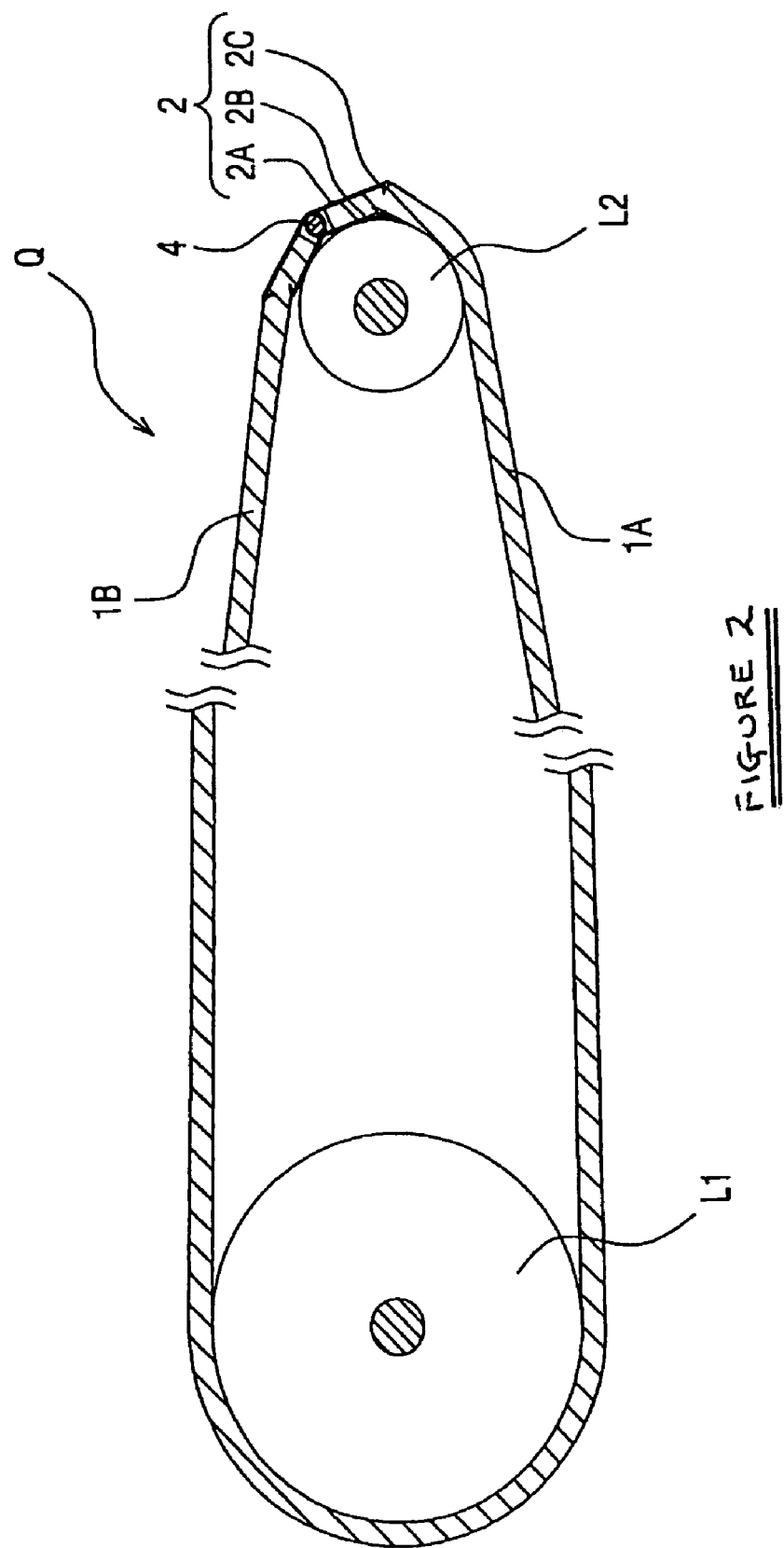
FIG. 2 is a sectional side view of the conveyor belt shown in FIG. 1.

Referring firstly to FIGS. 1 and 2 of the drawings, the belt conveyor P shown therein comprises a belt Q formed from a single elongate piece of material having adjoining ends 1A and 1B. The belt Q extends around two spaced rollers L1 and L2 and the adjoining ends of the belt Q are connected together by a plurality of U-shaped gripping elements 2 and a flexible hinge pin 4 which extends through protruding ends 3 of the gripping elements 2.

The joint between the two ends of the belt extends across the belt at an angle non-perpendicular to the direction of intended travel of the belt and preferably at an angle of between 15° and 60° to a line extending perpendicularly to the intended direction of travel of the belt.

The ends of the belt Q are, preferably, hardened (stiffened) and also bent over and glued to prevent them from fraying.

As best shown in FIG. 1, the U-shaped gripping elements 2 extend in the direction of intended travel of the belt Q and the gripping elements 2 attached to one of the adjoining ends of the belt alternate with the gripping elements 2 attached to the other adjoining end of the belt across the width of the belt.

As best shown in FIG. 2, each gripping element 2 comprising two arms 2A and 2B and a claw 2C at the free end of each arm 2A, 2B which grip opposite sides of the belt. The arms of 2A and 2B are of different lengths so that the claws 2C do not confront one another when they bite into the belt. The closed ends of the gripping elements 2 protrude from the adjoining end of the belt Q and a flexible hinge pin 4 extends through the closed ends of the gripping elements 2 of both adjoining ends of the belt Q to connect the adjoining ends of 1A and 1B of the belt together.

With this arrangement, only part of the hinge pin 4 and some of the gripping elements 2 make contact with a roller L1, L2 at the same time with the result that the remainder of the belt makes firm contact with the roller and this thus ensures smooth running of the belt around the rollers.

One method of securing the gripping elements to the adjoining ends of the belt will now be more particularly described with reference to FIGS. 3 to 5 of the accompanying drawings.

Figure 3:
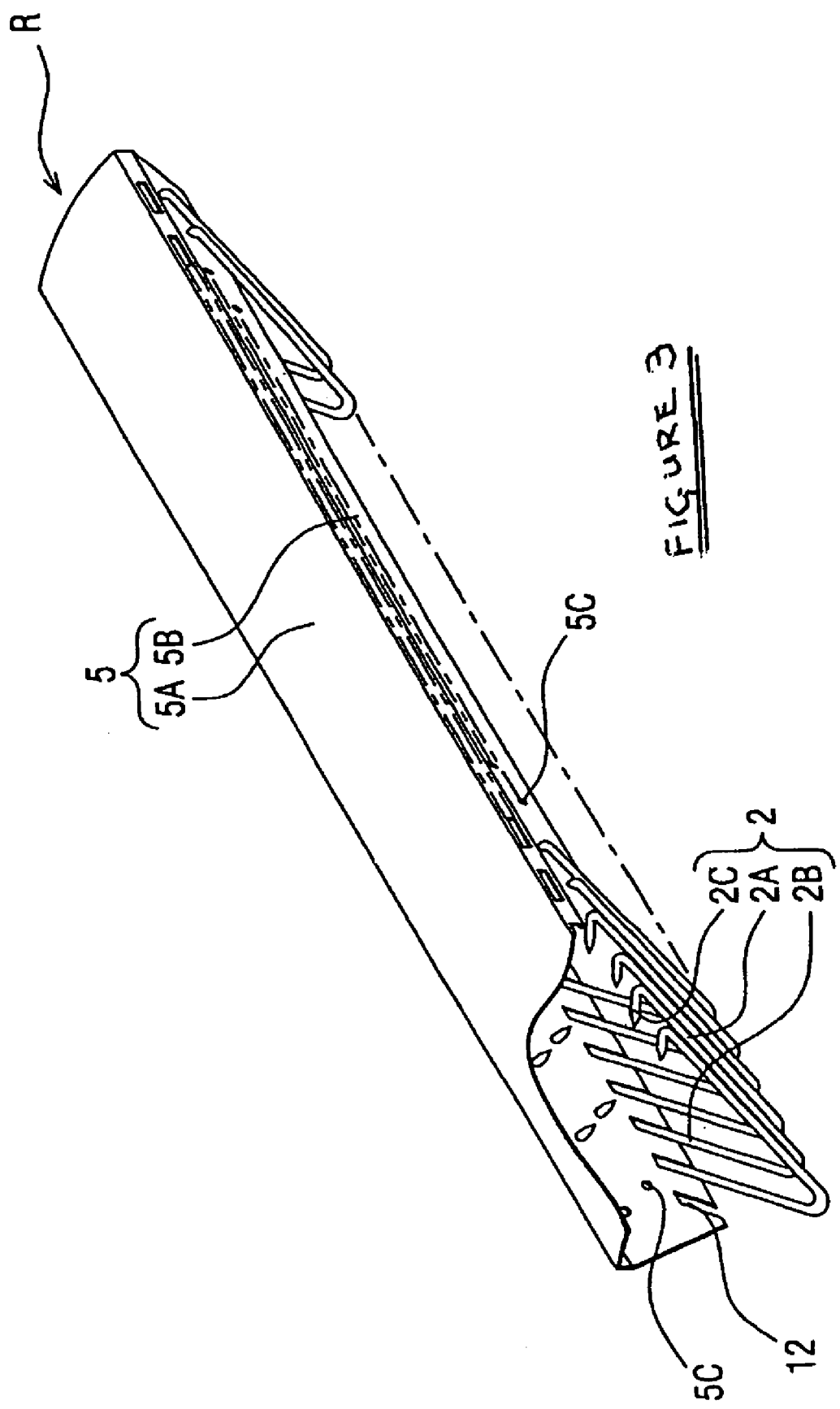
FIG. 3 is a perspective view of a hanger for the gripping elements, FIGS. 4a, b and c show steps in a method of attaching the gripping elements to an end of the conveyor belt.

FIG. 3 shows a belt connecting tool R comprising a support 5, preferably of flexible material and typically but not necessarily of paper, having a web portion 5A and two depending flank portions 5B which are inclined inwardly towards one another from the web portion 5A. Each flank portion 5B has a plurality of apertures 5C for receiving the claws 2C of the gripping elements 2. Also, at least one flank portion 5B of the support 5 has a plurality of comb-like teeth defining slots 12 which receive one arm 2B of the gripping elements 2 and support the gripping elements 2 at an angle to a plane normal to the longitudinal extent of the support 5 so that when attached to the respective adjoining end of the belt Q the gripping elements 2 will extend in the direction of intended travel of the belt.

Figure 5A:
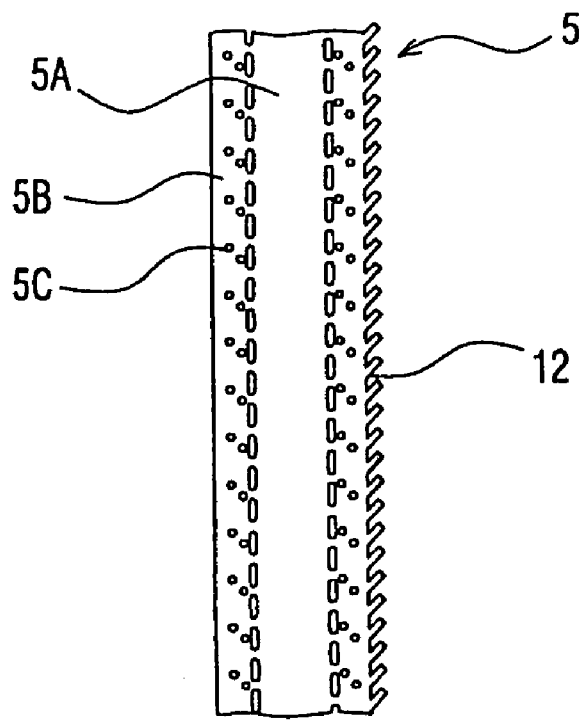
FIG. 5a is the developed view of the hanger shown in FIG. 3.
Figure 5B:
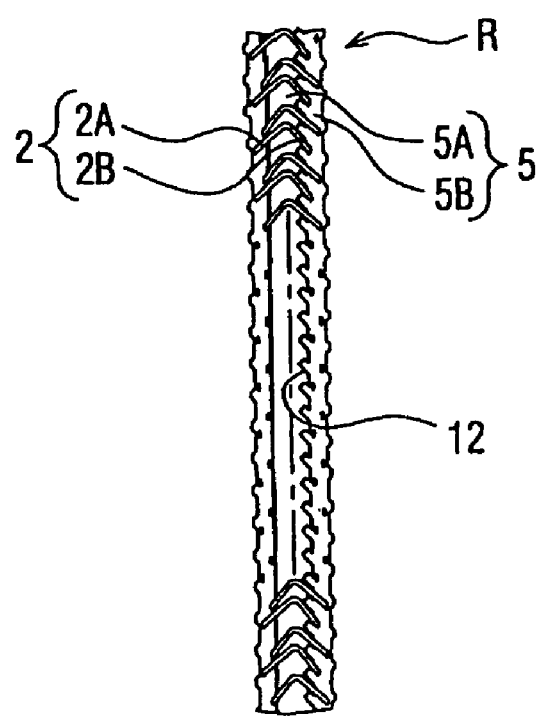
FIG. 5b is a bottom plan view of the hanger shown in FIG. 3.
Figure 7A:
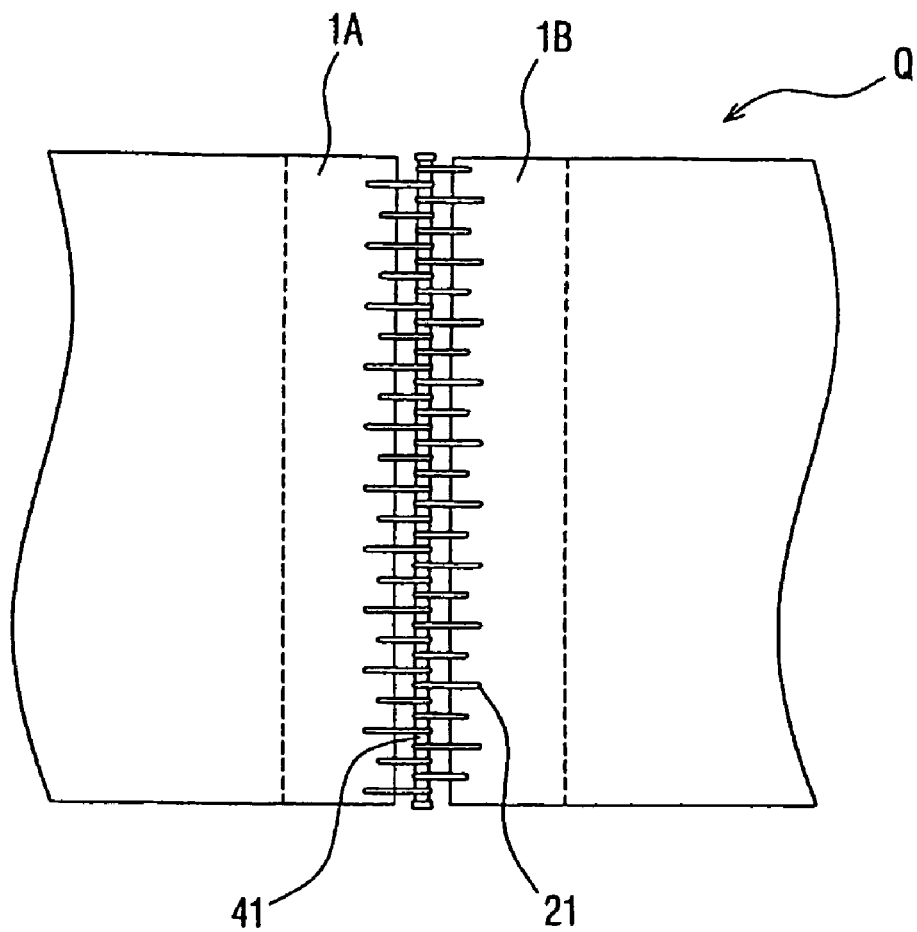
Figure 7B:
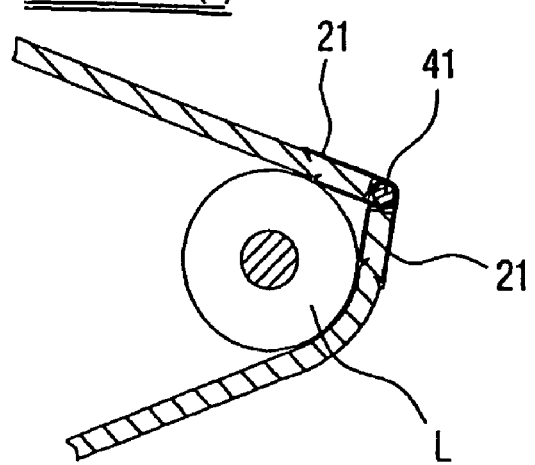

FIG. 5A is a developed view of the paper support 5 of FIG. 3 and FIG. 5B shows an underneath plan view of the support 5 of FIG. 3, together with some of the gripping elements 2. The comb-like teeth of the support 5 are clearly shown in FIGS. 5A and 5B as extending at an angle to a plane normal to the longitudinal extent of the support 5.

Figure 4A:
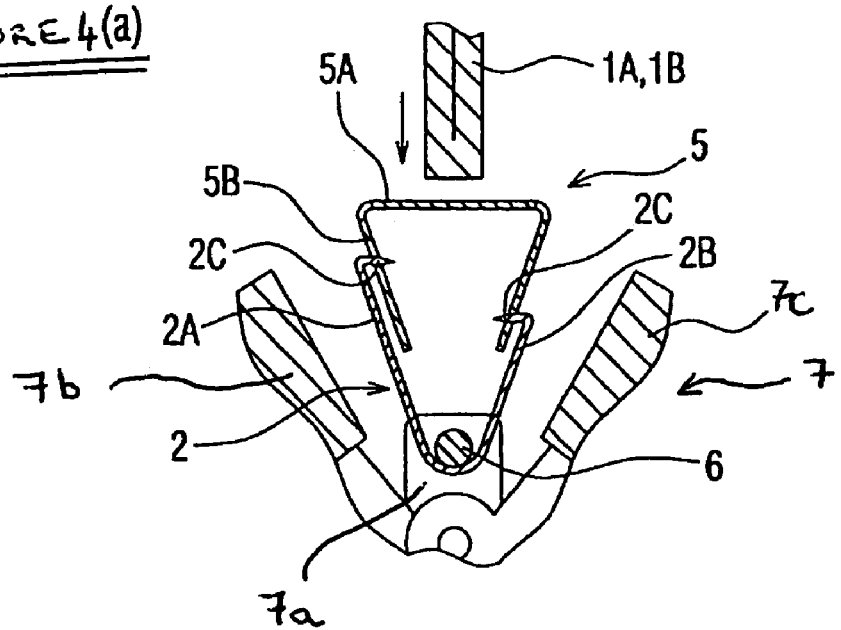
Figure 4B:
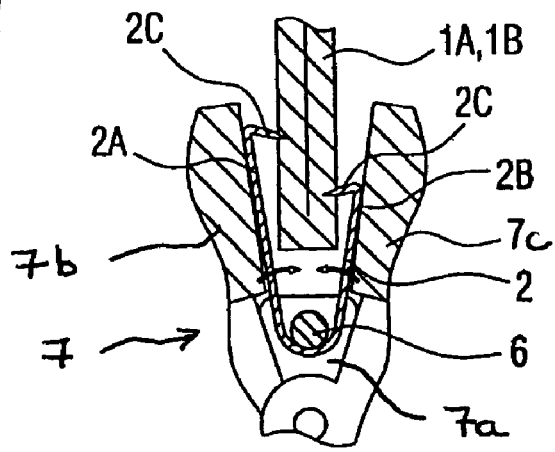

FIG. 4 shows three steps in a method of attaching the gripping elements to 2 to an end of the conveyor belt Q.

Figure 4C:
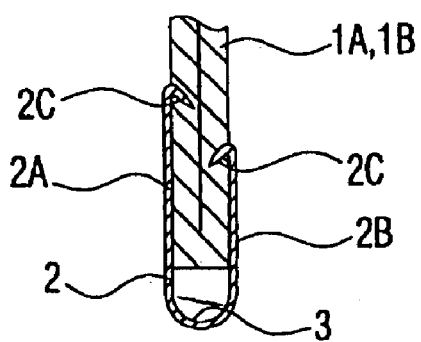

As shown in FIG. 4A, the gripping elements 2 are suspended from the paper support 5. The gripping elements 2 are then placed in a compressor 7 having a base component 7a and two pivotable jaws 7b and 7c. The base component 7a has a plurality of slots which are spaced apart along the longitudinal extent of the base component 7c and which receive the closed ends of the gripping elements 2 whilst the open ends of the gripping elements 2 are disposed between the jaws 7b and 7c. An elongate holding member in the form of a stem or rod 6 is then inserted through aligned apertures in the base component 7a in order to hold the gripping elements 2 in place. The gripping elements 2 may also be held by light pressure applied to them by the jaws of the compressor 7. The paper support is removed and the end 1A, 1B of the conveyor belt Q is then inserted downwards between the jaws of the compressor 7 and the jaws are closed to draw the arms 2A and 2B of the gripping elements together and to cause the claws 2C to bite into the material of the belt. The stem or rod 6 is then removed leaving the gripping elements 2 attached to the end 1A, 1B of the belt with the closed end protruding therefrom as shown in FIG. 4C.

The conveyor belt described above has a particular application for conveying articles of laundry in a commercial laundry, but is not confined to this particular application. Also, the belt could be made of two or more lengths of material joined together.

The embodiment described above is given by way of example only and various modifications will be apparent to persons skilled in the art without departing from the scope of the invention as defined by the appended claims.

What is claimed is:

1. A method of attaching gripping elements of a conveyor belt to an adjoining end of the belt, comprising the steps of:
   a. providing an elongate support having an upper web portion and two depending flank portions,
   b. hanging the gripping elements in spaced relationship with each element on the flank portions of the support,
   c. placing the gripping elements in a compressor with closed ends of the gripping elements supported by the compressor and open ends of the gripping elements between two closable jaws of the compressor,
   d. removing the support, and
   e. inserting the respective adjoining end of the belt between jaws of the compressor and closing the jaws of the compressor to attach the gripping elements to said adjoining end of the belt.

2. A method as claimed in claim 1, wherein the support holds the gripping elements at an angle to a plane normal to a longitudinal extent of the support so that, when attached to the respective adjoining end of the belt, the gripping elements will, in use, extend in or substantially in a direction of intended travel of the belt.

3. A method as claimed in claim 2, wherein at least one flank portion of the support has a plurality of comb-like teeth for holding the gripping elements at the aforesaid angle to a plane normal to the longitudinal extent of the support.

4. A method as claimed in claim 1, wherein the closed ends of the gripping elements are located in spaced apart slots in a base component of the compressor and are held in place in the slots by an elongate holding member which is inserted through the base component after placing the gripping elements in the compressor and which is removed after step (e) to allow the adjoining end of the belt and the gripping elements to be removed from the compressor.

5. A method as claimed in claim 1, wherein the support is a paper support.

* * * * *